May 16, 1933.  L. A. RUSSELL  1,909,507
CRANE TURNTABLE AND GEAR HOUSING
Filed Oct. 22, 1931   2 Sheets-Sheet 1
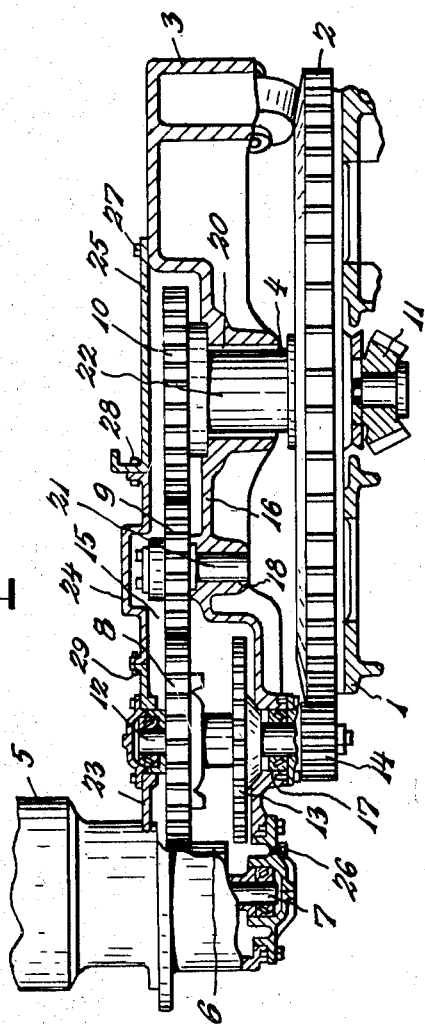
Inventor
LESLIE A. RUSSELL.
By Robb & Robb
Attorneys

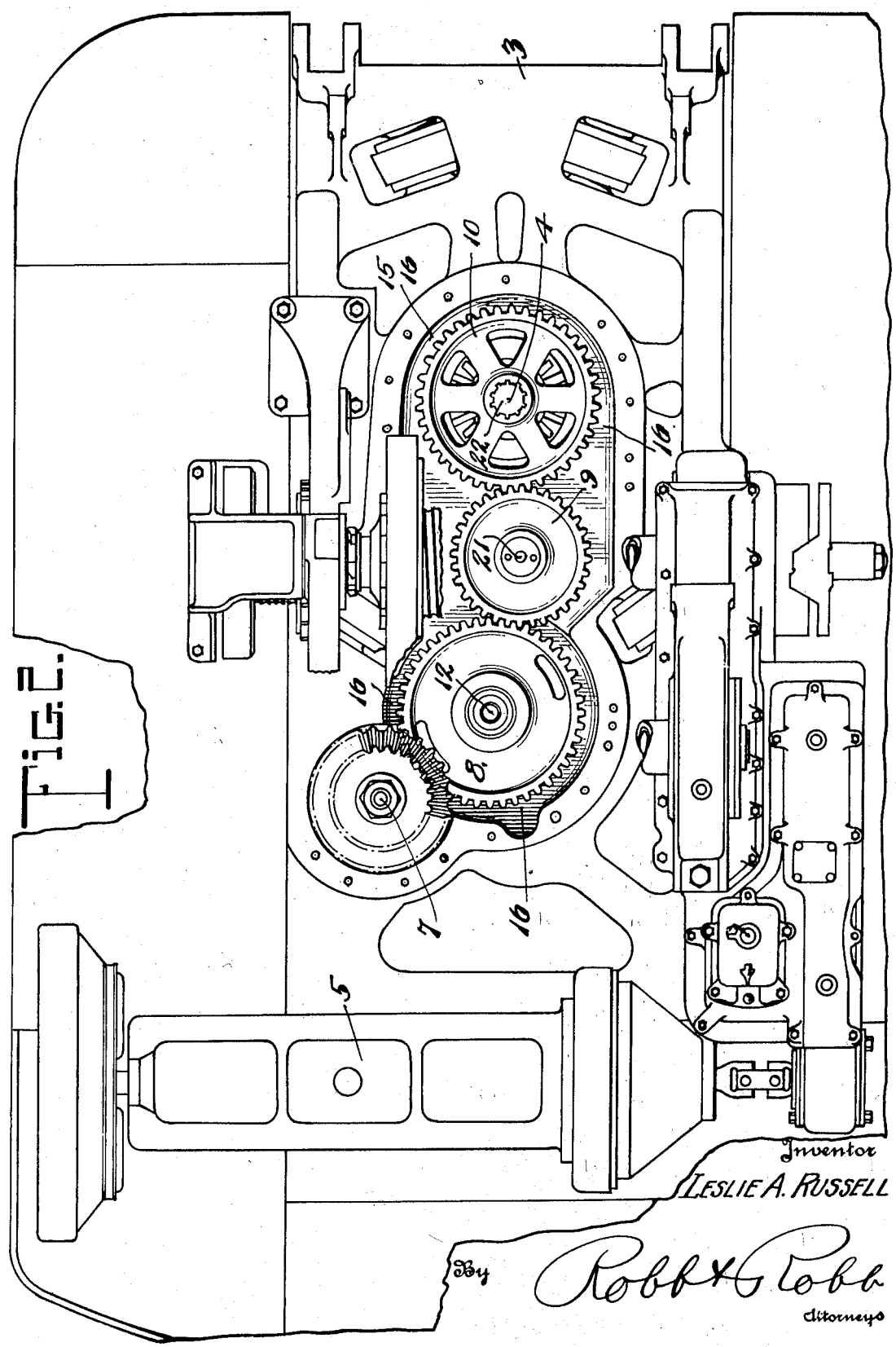

Patented May 16, 1933

1,909,507

UNITED STATES PATENT OFFICE

LESLIE A. RUSSELL, OF MILWAUKEE, WISCONSIN, ASSIGNOR TO KOEHRING COMPANY, OF MILWAUKEE, WISCONSIN, A CORPORATION

CRANE TURNTABLE AND GEAR HOUSING

Application filed October 22, 1931. Serial No. 570,461.

This invention has to do with cranes or excavating machines of the clam shell, dragline, and shovel types, wherein the crane comprises what is called a swing body which includes a turntable structure that supports the cab or housing, an engine or power plant, and the drive gearing with its controlling means for taking off power to be transmitted to the operating drums, the swing body, and the traction means.

The purpose of the invention is to deal primarily with the problem of reducing the number of exposed gears, and individually lubricated gears, carried by the turnable. More specifically the invention relates to the swing and traction power transmitting gears for taking the power from the engine to operate the swing body for rotation purposes, and to transmit driving force to the traction devices which are usually endless belts. Heretofore the swing and traction power transmitting gears have been mounted on shafts extending upwardly from the turntable. They are exposed, not easy to lubricate, take up space by their projecting arrangement, and otherwise are not arranged to advantage in affording a compact assembly of the gear parts of the machine.

By my invention I have designed a turntable unit formed with an integral gear compartment or countersunk housing structure in which I am enabled to mount the swing idler and traction shafts and gears below the plane of the surface of the upper face of the turntable, out of the way, but with effective operative arrangements more satisfactory than heretofore. Moreover I utilize this gear compartment of the turntable as an oil or lubricant casing so that the gears are running continuously in oil and are therefore not only continuously lubricated but the noise incident to their operation is materially reduced, giving a more silent running machine as a result.

This application relates to my copending applications Serial No. 420,892, filed January 15, 1930, and Serial No. 490,055, filed October 20, 1930, and the primary aim of the invention presented herein is to eliminate undesirable gear and shaft arrangements that have been customarily used heretofore, produce a noiseless operation of the gearing system for the operating of the swing body and traction devices, and otherwise afford the advantages hereinbefore presented.

The gear enclosing turntable structure of my invention affords opportunity to provide a dust-proof casing or housing feature having the additional advantage of reducing liability of accidents due to the exposure heretofore of the gears, in addition to the advantages above presented.

For a full and clear understanding of my invention, reference is to be had to the following description and to the acompanying drawings, in which;

Figure 1 is a fragmentary sectional view of a turntable structure forming a part of the swing body of a crane excavating machine, some parts being shown in elevation and the mode of formation of the gear housing as a part of the structure of the turntable being clearly illustrated, and Figure 2 is a top view of the construction shown in Figure 1.

Referring now to the specific structure comprising my invention and especially to the drawings depicting the same, 1 indicates the upper portion of the traction base of the crane or excavating machine, the traction devices consisting of wheels or endless belts not being shown, they being immaterial to the invention. Carried by the traction base 1 is the usual swing gear 2, the function of which is well known to those versed in this art. The excavating machine of this invention being of the rotary crane type, there is provided the usual swing body, the base of which comprises a turntable 3 rotatably mounted as shown at 4. On the swing body is supported an engine, a portion of which is shown at 5, and the usual gearing systems and control instrumentalities as generally used on this type of excavating machines. For the purpose of driving the traction device carried by the traction base 1 and for the purpose of operating the swing body to rotate it upon the traction base 1 there is a system of swing and traction gear employed comprising the gears 8, 9, 10 and the beveled gear 11.

The gear 8 is mounted upon a shaft 12 which also carries a clutch gear 13. A pinion 14 mounted upon the shaft 12 is in engagement with the swing gear 2 and is adapted to transfer rotation from the gear 6 to the said ring gear when the gear 6 is shifted into such a position as to mesh with gear 13. The rotation of the pinion 14 will cause swinging of the turntable 3 in a very well known manner.

The turntable 3 comprises a compartment 15 for the reception of the gear system previously described, the gears 6, 8, 9, 10, and 13 of the said gear system being disposed at different heights therein. The said compartment consists of a countersunk or depressed portion of the turntable structure and is integral therewith. The said depressed portion, which is indicated at 16, is provided with bearings 17, 18, and 20, for the reception of shafts 12, 21, and 22 upon which are mounted the gears 8, 9, 10, and 13 as previously described.

The upper portion of the compartment 15 is closed by means of plates 23, 24, and 25, but it should be understood that instead of using three plates as illustrated in the drawings, one plate serving as a closure for the said compartment may be used.

The compartment 15 may be filled with a lubricant so as to assure proper lubrication of the gear system contained therein and enclosed thereby. A drain cock 26 may be provided for the removal of lubricant when the same has become diluted. The cover of the compartment 15 which consists of plates 23, 24, and 25, as previously described, is connected to the turntable 3 in a dust-proof manner and is properly held in place by means of screws 27, 28, and 29.

The gears within the compartment 15 will assure an entirely noiseless operation, and the lubricant within which the said gears are immersed, will assist in the accomplishment of these results, and unnecessary wear of the moving parts of the gear system and vibration thereof will be entirely eliminated.

It will become apparent from the foregoing description that various changes in the details of construction of this device may be made without departing from the inventive concept, which changes will readily suggest themselves to those skilled in the art. It will be accordingly understood that it is intended and desired to embrace within the scope of this invention such modifications and changes as may be necessary to adapt it to varying conditions and uses.

Having thus described my invention, what I claim as new and desire to secure by Letters Patent of the United States, is:—

A machine of the class described comprising a swing body having a turntable, a traction base, a source of power on the said swing body, a depression in the said turntable and a cover plate therefor forming a dust-proof compartment, power transmitting means within the said compartment adapted to direct energy from the source of power to the traction base and to operate the turntable, the said power transmitting means being placed at different planes within the said compartment and enclosed thereby.

In testimony whereof I affix my signature.

LESLIE A. RUSSELL.